(12) United States Patent
Whitson, Jr. et al.

(10) Patent No.: US 8,533,254 B1
(45) Date of Patent: Sep. 10, 2013

(54) METHOD AND SYSTEM FOR REPLICATING CONTENT OVER A NETWORK

(75) Inventors: William Charles Whitson, Jr., Everett, WA (US); Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 2060 days.

(21) Appl. No.: 10/464,682

(22) Filed: Jun. 17, 2003

(51) Int. Cl.
*G06F 15/16* (2006.01)

(52) U.S. Cl.
USPC .......................................... 709/203; 709/217

(58) Field of Classification Search
USPC .................... 707/10; 709/203, 217; 370/312
See application file for complete search history.

(56) References Cited

U.S. PATENT DOCUMENTS

| | | | | |
|---|---|---|---|---|
| 5,799,305 | A * | 8/1998 | Bortvedt et al. | 707/10 |
| 6,421,688 | B1 | 7/2002 | Song | |
| 6,738,773 | B1 * | 5/2004 | Reunert et al. | 707/10 |
| 7,710,867 | B1 * | 5/2010 | Masters | 370/229 |
| 8,204,930 | B1 * | 6/2012 | Kee et al. | 709/203 |
| 2002/0133491 | A1 * | 9/2002 | Sim et al. | 707/10 |
| 2003/0018732 | A1 * | 1/2003 | Jacobs et al. | 709/208 |
| 2003/0093567 | A1 * | 5/2003 | Lolayekar et al. | 709/246 |

OTHER PUBLICATIONS

Liskov et al., Replication in the Harp File System, 1991, ACM. pp. 226-238.*
Daniel Varela Santoalla, DBBalancer Manual, Archive dated Feb. 5, 2002 via Wayback Machine at www.archive.org, Chapter 1, pp. 1-2.*
Unknown, "DBBalancer Manual", dbbalancer.sourceorge.et Website, Chapters 1-7.

* cited by examiner

*Primary Examiner* — Oleg Survillo
(74) *Attorney, Agent, or Firm* — Frommer Lawrence & Haug LLP; Jamie L. Wiegand

(57) ABSTRACT

A system and method is directed to replicating packet transactions over a network. The system includes a replication component and a plurality of servers enabled to include substantially the same content. The replication component receives a packet from a client and forwards it to a first server. If the packet is to be replicated, a replicate of the packet is forwarded to the other servers in the plurality of servers so that at least a portion of the content on the first server and the other servers are synchronized. Forwarding of the replicate packet may be delayed for some period of time, and need not be concurrent. If responses received from each server are substantially the same, a message is sent to the client. Moreover, transaction replication can occur across servers arranged in different configurations, including disparate databases.

22 Claims, 6 Drawing Sheets

METHOD AND SYSTEM FOR REPLICATING CONTENT OVER A NETWORK

FIELD OF THE INVENTION

The present invention relates to network traffic replication, and in particular to a method and system for replicating packet transactions over a network between at least two network devices.

BACKGROUND OF THE INVENTION

Users commonly employ computerized databases, or the like to store large amounts of data for easy access and manipulation. In a traditional computer system, there is a single copy of the data stored typically on a single server. By maintaining a single, centralized storage, such a system avoids inconsistencies that might otherwise occur with more than one copy of the data. Nevertheless, the centralized storage approach has several drawbacks. First, since only one copy of the data exists, if the data becomes corrupted or inaccessible, the entire system becomes unavailable. Second, with only one copy of data available for read purposes, the system may appear slow and time-consuming, especially to multiple users.

Consequently, many of today's organizations, protect against disruptions caused by failures of a single server, by allowing additional copies or "replicas" of the data to be stored on multiple servers. That is, a copy of each data item stored on one of the system's servers may also exist on another server, sometimes called a replicate server. Such replicate servers may be collocated, or distributed across multiple locations. By replicating the data across multiple instances of servers, a certain degree of fault-tolerance may be obtained. Furthermore, by having an available replica of the data available, the response time of certain transactions may be improved.

Although replicated systems provide the above advantages over non-replicated systems, there are nonetheless inherent costs associated with the replication of data. To replicate data many of today's architectures require significant overhead in applications that manage the data itself. Furthermore, each application may need to have substantially the same configuration as every other data application to enable replication between them, resulting in an additional load on each application. Thus, previous solutions may be unacceptable in complex, network-level, high availability systems. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" include plural references. The meaning of "in" includes "in" and "on."

Briefly stated, the present invention is directed to a system, apparatus, and method for replicating packet transactions over a network between at least two network devices, such as servers, and the like. The system includes a replication component and a plurality of servers enabled to include at least a portion of their content that is substantially the same across each server. The replication component receives a packet from a client and forwards it to a first server in the plurality of servers. If the packet is to be replicated, a replicate of the packet is forwarded to the other servers in the plurality of servers so that at least a portion of the content on the first server and the other servers are synchronized. Replication may be based in part on whether the transaction is a read transaction, a write transaction, or another characteristic associated with the packet. In one embodiment, forwarding of the replicate packet to the other servers may be delayed for some period of time. Responses may be received from each server. If each received response is substantially the same, a message is sent to the client. Moreover, the plurality of servers may include disparate configurations for at least two servers. That is, the present invention enables transaction replication across disparate databases, servers, applications, and the like.

Illustrative Operating Environment

Figure 1:
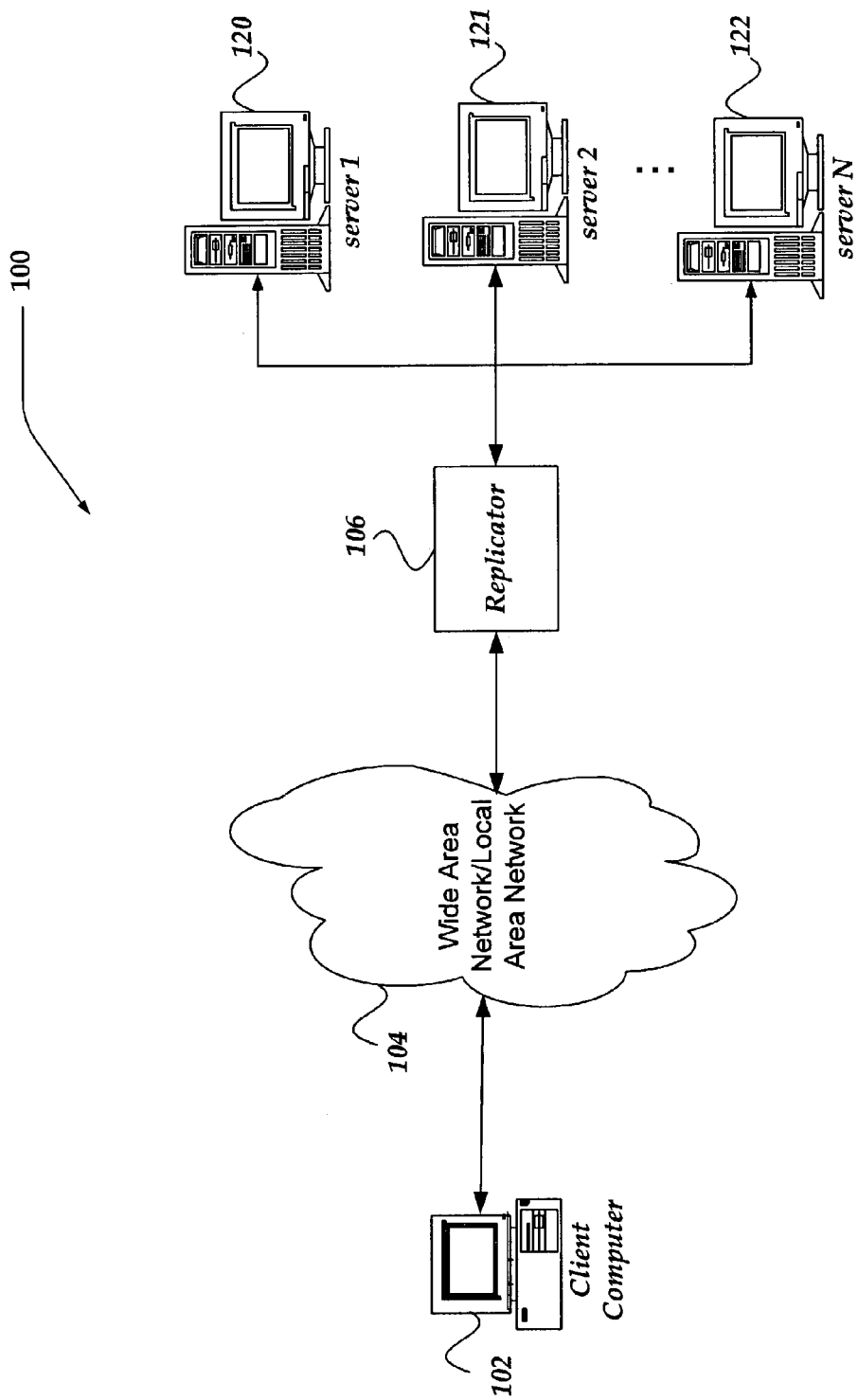
FIG. 1 illustrates an exemplary environment in which a replicator operates to replicate a packet transaction over a network between at least two servers.

FIG. 1 illustrates an exemplary environment in which a replicator operates to replicate a packet transaction over a network on at least two servers. Replication system 100 may include many more components than those shown, however, they are sufficient to disclose an illustrative embodiment for practicing the invention.

As shown in the figure, replication system 100 includes client computer 102, wide area network (WAN)/local area network (LAN) 104, replicator 106, and server computers 120-122. WAN/LAN 104 is in communication with client computer 102 and replicator 106. Replicator 106 is also in communication with server computers 120-122.

Client computer 102 may be any device capable of sending and receiving a packet over a network, such as WAN/LAN 104, to and from servers 120-122. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client computer 102 may be any device that is capable of connecting using a wired or wireless communication medium such as a PDA, POCKET PC, wearable computer, and any other device that is equipped to communicate over a wired and/or wireless communication medium.

WAN/LAN 104 couples replicator 106 with client computer 102. WAN/LAN 104 is enabled to employ any form of computer readable media for communicating information from one electronic device to another. In addition, WAN/LAN 104 can include the Internet in addition to local area networks (LANs), wide area networks (WANs), direct connections, such as through a universal serial bus (USB) port, other forms of computer-readable media, and any combination thereof.

On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, WAN/LAN 104 includes any communication method by which information may travel between client computer 102 and replicator 106.

Servers 120-122 may include any computing device capable of communicating packets with client computer 102. Each packet may convey a piece of information. A packet may be sent for handshaking, i.e., to establish a connection or to acknowledge receipt of data. The packet may include information such as a request, a response, a put command, a configuration command, or the like. For example, a packet may represent a write transaction, a read transaction, or the like, to a database, or other application hosted on servers 120-122. The communicated information may also be associated with Object Transaction Services, and the like, for the Common Object Request Broker Architecture (CORBA), Common Object Models (COM), Distributed Common Object Models (DCOM), and the like.

Generally, packets received by servers 120-122 will be formatted according to TCP/IP, but they could also be formatted using another transport protocol, such as User Datagram Protocol (UDP), Internet Control Message Protocol (ICMP), NETbeui, IPX/SPX, token ring, and the like.

Moreover, servers 120-122 are arranged such that at least a portion of content on each server may be replicated across the other servers 120-122. In one embodiment, one server is pre-determined as a master server for content. However, the present invention is not so limited, and no server need be pre-determined as the master server for the content. Moreover, where an implementation does pre-determine a master server for the content, the designation may be rotated through servers 120-122, always designated to a particular server, or determined based on a variety of conditions, events, and the like. For example, a master server may be designated based on availability of a given server, loads, network traffic, server configuration, and the like. Moreover, the remaining servers in the array of servers 120-122 are typically designated as replicate servers. Thus, for example, if server 120 represents the master server, servers 121 and 122 represent replicate servers.

Servers 120-122 may be configured to operate as a website, a File System, a File Transfer Protocol (FTP) server, a Network News Transfer Protocol (NNTP) server, a database server, and the like. Where servers 120-122 are configured to operate as database servers, the database applications may be of disparate configurations. For example, server 120 may be configured as a Structured Query Language (SQL) database server, while server 121-122 are each configured with disparate vendor specific database applications, non-SQL database applications, and the like.

Figure 2:
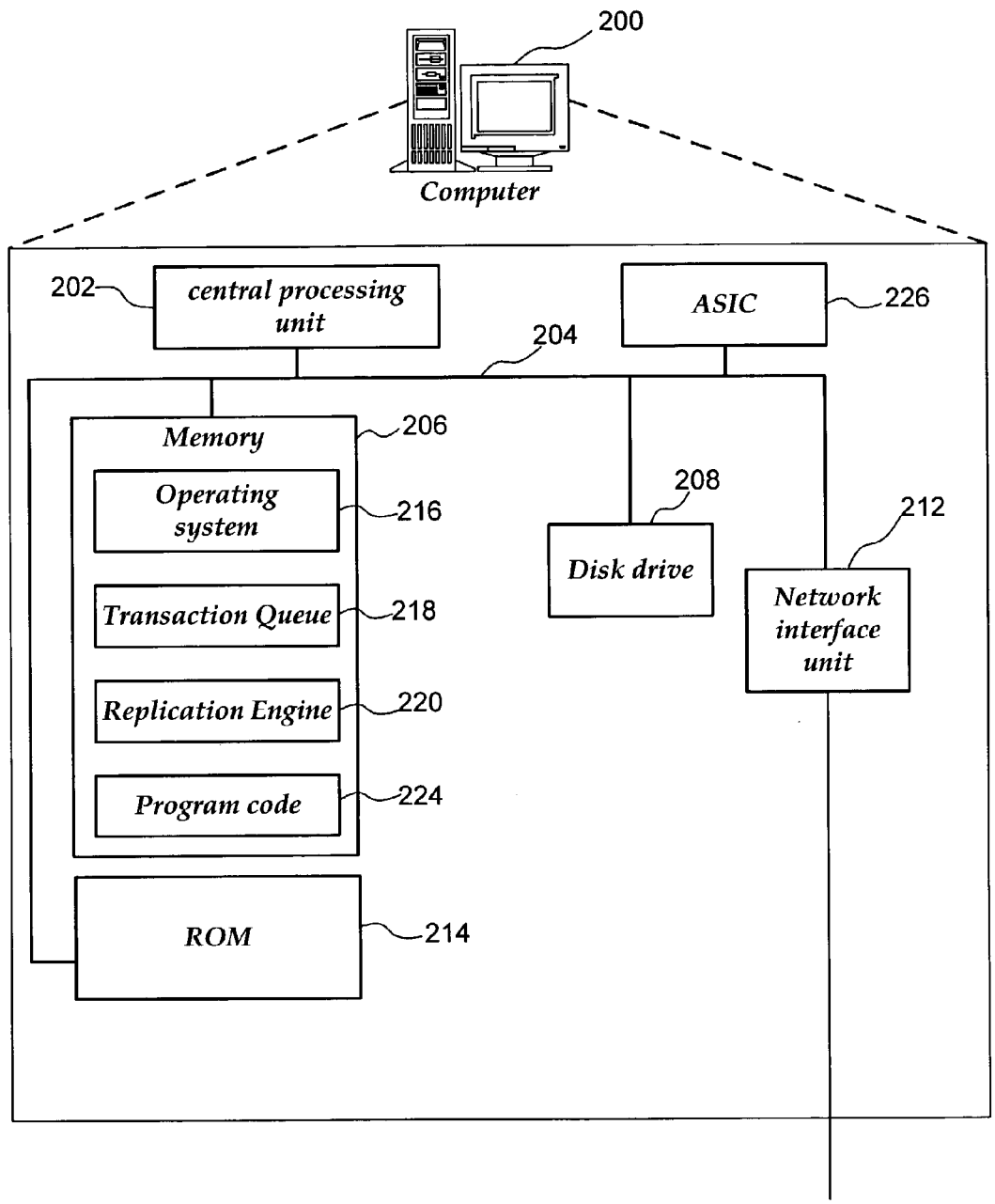
FIG. 2 illustrates components of an exemplary environment in which the invention may be practiced.

Devices that may operate as servers 120-122 include, but are not limited to, personal computers desktop computers, multiprocessor systems, microprocessor-based or programmable consumer electronics, network PCs, servers, and the like. FIG. 2 illustrates one embodiment of a network device that may operate as servers 120-122.

Replicator 106 may be virtually any network device that is configured to receive and forward a packet. Such devices include, for example, routers, proxies, firewalls, load balancers, devices that perform network address translation, any combination of the preceding devices, and the like. FIG. 2 illustrates one embodiment of a network device that may operate as replicator 106.

Replicator 106 may receive the packet from a variety of sources, including client computer 102, servers 120-122, or another system (not shown). Upon receipt of the packet, replicator 106 makes a determination on how to manage the packet. If the packet is received from client computer 102, replicator 106 may evaluate the packet to determine whether the packet is destined for servers 120-122. If the packet is destined for servers 120-122, replicator 106 may further determine whether the packet is to be replicated across each of servers 120-122. Replication may be based on a variety of criteria, including but not limited to, a packet IP header, TCP header, a payload, IP option, IP flag, TCP port number, UDP port number, or any other data segment associated with the packet. In one embodiment, replication of the packet is based on whether the packet payload includes a write transaction, or any other substantially similar action.

Replicator 106 is further configured to log the packet in a transaction queue. The transaction queue may include a file, database, directory, and the like. Moreover, the transaction queue may reside in memory, CD-ROM, digital versatile disks (DVD) or other optical storage, magnetic cassettes, magnetic tape, magnetic disk storage, and any other storage devices.

Replicator 106 may determine a first server in the array of servers to which the packet is forwarded. The first server may be selected based on a variety of mechanisms, including whether the packet is to be replicated, payload of the packet, network traffic, network topology, capacity of the server, payload of the received packet, server availability, and the like. For example, if the payload of the packet includes a write transaction the selected first server may a pre-determined server, such as the master server, and the like. Replicator 106 may also perform a network address translation (NAT) on the packet. That is, in a TCP/IP packet, replicator 106 may change the source field to a source address of replicator 106. Replicator 106 forwards the packet to the selected first server.

If the packet is to be replicated, replicator 106 may open a connection with at least one replicate server in the array of servers 120-122. Replicator 106 forwards the packet to at least one replicate server, such that at least a portion of the content on the selected server and at least one replicate server are synchronized. In one embodiment, replicator 106 delays replication across the at least one replicate server for a later time. Replicator 106 may also batch several packets for replication at a later time. Moreover, replicator 106 may replicate the packet across each replicate server in the array of servers 120-122.

Replicator 106 is further configured to receive a response packet from the selected first server, and to log the response packet. Each replicate server may also send a replicate response packet to replicator 106. Replicator 106 compares each response packet to each other. If each response packet is substantially the same, replicator 106 sends a message to client computer 102. In one embodiment, the message includes the response packet from the selected first server. Where the response packets are not substantially the same, replicator 106 is configured to perform various actions. For example, replicator 106 may resend the packet to the replicate server that provided a response that is not substantially the same, until the response packets are substantially similar, or for a pre-determined number of times, and the like.

Replicator 106 may also send a message to client computer 102 indicating the existence of an error. Replicator 106 may further request that the transaction associated with the packet be undone in the selected server. Replicator 106's actions may also include logging an error event, terminating replication attempts, and the like.

In one embodiment of the present invention, replicator 106 is configured to enable replication of the packet across disparate server configurations. For example, replicator 106 may include a subset of an overall functionality of a vendor's normal application client, which enables forwarding of a transformed packet to the disparate server. Replicator 106 may be configured to address commands to send packets to the disparate server in a different format, protocol, and the like. Replicator 106 may also be enabled to provide re-request packets, error handling, or the like, to the disparate server. Furthermore, replicator 106 may be enabled to handle a variety of disparate responses from servers 120-122.

FIG. 2 illustrates components of an exemplary environment in which the invention may be practiced. It will be appreciated that not all components of network device 200 are illustrated, and that network device 200 may include more or fewer components than those shown in FIG. 2. Network device 200 may operate, for example, as a router, bridge, firewall, gateway, traffic management device (also referred to as a traffic manager), distributor, load balancer, server array controller, proxy server, and the like. Communications takes over a network, e.g., the Internet, WAN, LAN, and/or any other communication network.

As illustrated in FIG. 2, network device 200 includes a central processing unit (CPU) 202, mass memory, and network interface unit 212 connected via bus 204. Network interface unit 212 includes the necessary circuitry for connecting network device 200 to network 130, and is constructed for use with various communication protocols including the TCP/IP and UDP/IP protocol. Network interface unit 212 may include or interface with circuitry and components for transmitting messages and data over a wired and/or wireless communication medium. Network interface unit 212 is sometimes referred to as a transceiver.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, or Windows™

In one embodiment, the mass memory stores program code and data for implementing replication engine 220 and transaction queue 218. The mass memory may also store additional program code 224 and data for performing the functions of network device 200.

In one embodiment, the network device 200 includes at least one Application Specific Integrated Circuit (ASIC) chip 226 coupled to bus 204. As shown in FIG. 2, network interface unit 212 is also coupled to bus 204. ASIC chip 226 can include logic that performs some of the actions of network device 200. For example, in one embodiment, ASIC chip 226 can perform a number of packet processing functions for incoming and/or outgoing packets. In one embodiment, ASIC chip 226 can perform at least a portion of the logic to enable the operation of traffic engine 220. In one embodiment, the network device 200 can include one or more field-programmable gate arrays (FPGA) (not shown), instead of, or in addition to, ASIC chip 226. A number of functions of the network device can be performed by ASIC chip 226, an FPGA, by CPU 202 with instructions stored in memory, or by any combination of the ASIC chip, FPGA, and CPU.

Computer storage media may include volatile and nonvolatile, removable and non-removable media implemented in any method or technology for storage of information, such as computer readable instructions, data structures, program modules, or other data. Examples of computer storage media include RAM 206, ROM 214, EEPROM, flash memory or any other memory architecture, CD-ROM, digital versatile disks (DVD) or any other optical storage, magnetic cassettes, magnetic tape, magnetic disk storage or any other magnetic storage devices, or any other medium that can store information to be accessed by a computing device.

Network device 200 may also include an input/output interface (not shown) for communicating with external devices and/or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

Figure 3:
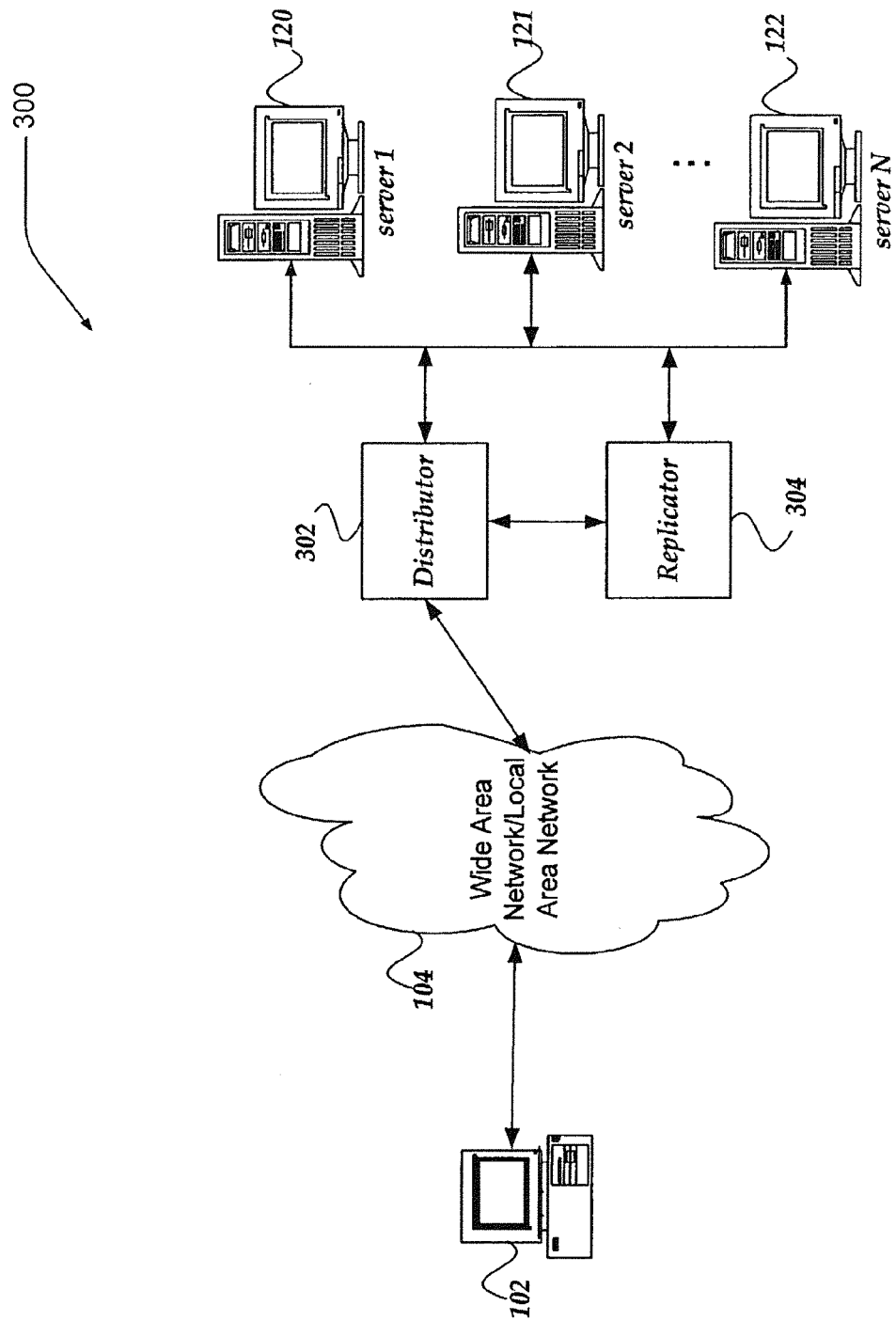
FIG. 3 illustrates one embodiment in which a distributor manages a packet transaction over a network to a transaction replicator.

FIG. 3 illustrates one embodiment in which a distributor manages a packet transaction over a network to a replicator. Distribution system 300 may include many more components than those shown.

As shown in the figure, distribution system 300 includes client computer 102, wide area network (WAN)/local area network (LAN) 104, distributor 302, replicator 304, and server computers 120-122.

WAN/LAN 104 is in communication with client computer 102 and distributor 302. Replicator 304 is in communication with server computers 120-122, and distributor 302. Distributor 302 is also in communication with server computers 120-122.

Components numbered similarly to those in FIG. 1 operate in a substantially similar manner. A difference between the environment shown in FIG. 1 and that shown in FIG. 3 is the presence of distributor 302.

Distributor 302 may be any device that manages network traffic. Such devices include, for example, routers, proxies, firewalls, load balancers, devices that perform network address translation, any combination of the preceding devices, and the like. One embodiment of distributor 302 is the "BIG-IP" traffic management solution produced by F5 Networks, Incorporated, of Seattle, Wash.

Distributor 302 may receive a packet from client computer 102. Distributor 302 may forward the packet based on a variety of criteria, including, but not limited to, a packet IP header, TCP header, payload, IP option, IP flag, TCP port number, UDP port number, and any other data segment associated with the packet. In one embodiment, the packet is forwarded based on whether the packet payload includes a write transaction, a read transaction, or similar action. Where a packet is encrypted, such as employed with Secure Sockets Layer (SSL) packets, distributor 302 may also be configured to decrypt the packet so that subsequent analysis may be performed on the packet.

For example, if the packet is associated with a write transaction, distributor 302 may forward the packet to replicator 304. If the packet is associated with a read transaction, or a similar action, distributor 302 may select a server in the array of servers 120-122 to which the packet is forwarded. Distributor 302 may select the server based on network traffic, network topology, capacity of the server, payload of the packet, and the like. Distributor 302 may also select a pre-determined server, such as the master server, in the array of servers 120-122. Distributor 302 may recognize packets that are part of a substantially similar communication, flow, and/or stream and may perform special processing on such packets, such as directing them to the same server, or to replicator 304.

Distributor 302 may forward the packet to the selected server, and receive another packet in response from the selected server. Distributor 302 may forward the response packet to client computer 102. Moreover, distributor 302 may be configured to modify a TCP/IP address in the packet prior to forwarding the packet. Distributor 302 may also modify a TCP/IP address in the response packet prior to forwarding it to client computer 102.

Distributor 302 may also log the packet received from client computer 102, and the response packet from the selected server.

Distributor 302 may be further configured to communicate with replicator 304 through a separate intercommunication protocol to provide status information, and the like. Distributor 302 may for example provide status information about whether a server in the array of servers 120-122 is available.

Distributor 302 may be implemented using one or more personal computers, multiprocessor systems, and the like.

Such devices may be implemented solely in hardware, software, or any combination of hardware and software. For example, such devices may include application specific integrated circuits (ASICs) coupled to one or more microprocessors. These ASICs may be used to provide a high-speed switch fabric while the microprocessors may perform higher layer processing of packets. An exemplary device that could be used as distributor 302 is network device 200 of FIG. 2, configured with appropriate software.

Replicator 304 can operate in a manner substantially similar to the operation of replicator 106 in FIG. 1, with some of its functionality now subsumed by distributor 302. For example, distributor 302 could forward the packet to be replicated to replicator 304, such that replicator 304 need not determine if the packet is to be replicated. Hence, replicator 304 may be configured to replicate each packet received from distributor 302. Moreover, replicator 304 may employ status information about servers 120-122 to determine which servers to forward the replicate packet to.

Figure 4:
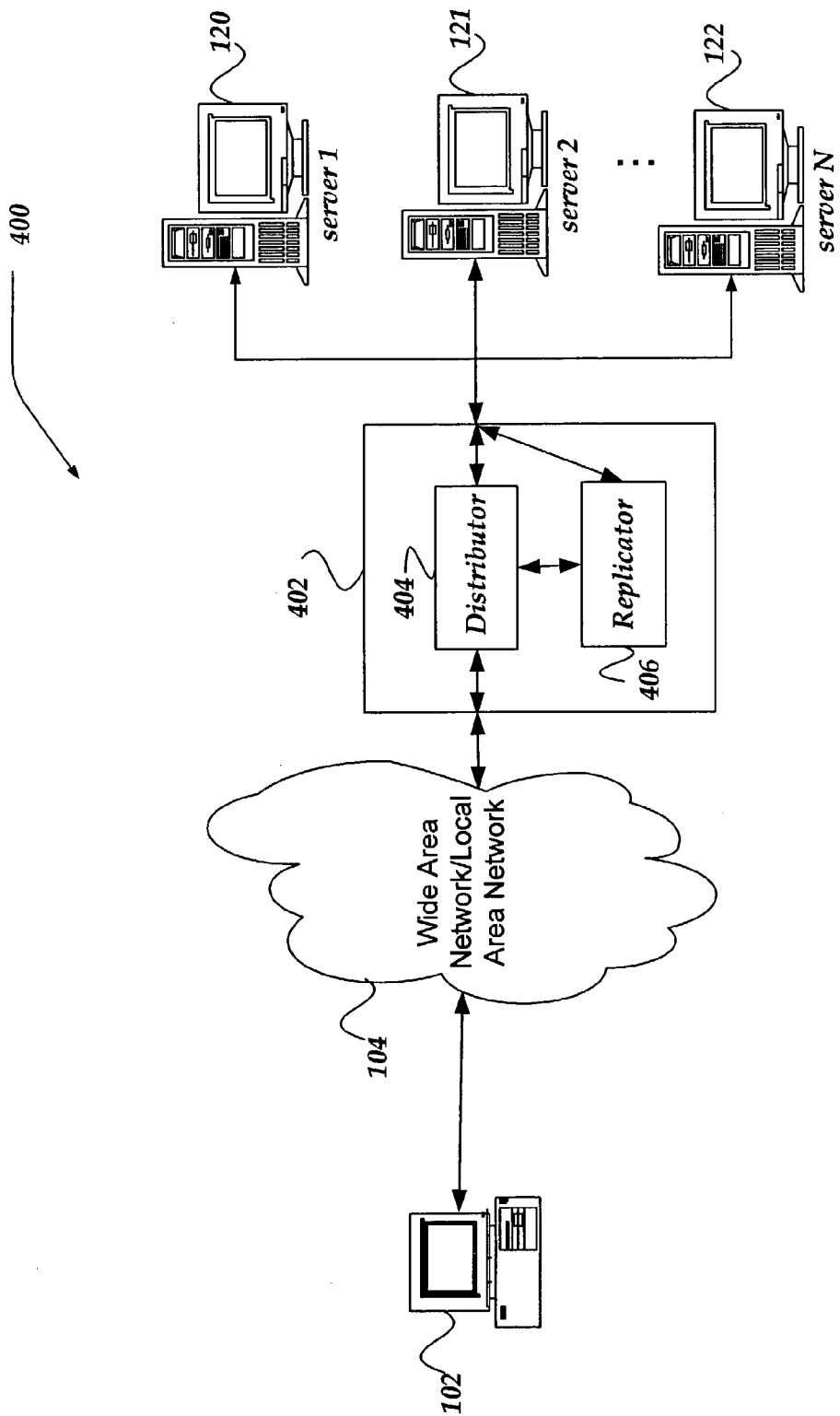
FIG. 4 illustrates one embodiment of an integrated distributor/transaction replicator for replicating a packet transaction over a network.

FIG. 4 illustrates one embodiment of an integrated distributor/replicator for replicating a packet transaction over a network. Replication system 400 may include many more components than those shown.

As shown in the figure, replication system 400 includes client computer 102, wide area network (WAN)/local area network (LAN) 104, integrated system 402, and server computers 120-122. Integrated system 402 further includes distribution component 404 and replication component 406. WAN/LAN 104 is in communication with client computer 102 and integrated system 402 through distribution component 404. Replication component 406 is in communication with server computers 120-122, and distribution component 404. Distribution component 404 is also in communication with server computers 120-122.

Components numbered similarly to those in FIG. 3 operate in a substantially similar manner. A difference between the environment shown in FIG. 3 and that shown in FIG. 4 is that the functionality of distributor 302 and replicator 304 have been combined in integrated system 402. The configuration of FIG. 4 may be used for various reasons including to lower costs (of providing two distinct devices), saving space, and the like.

Illustrative Operation for Replicating Content

Figure 5:
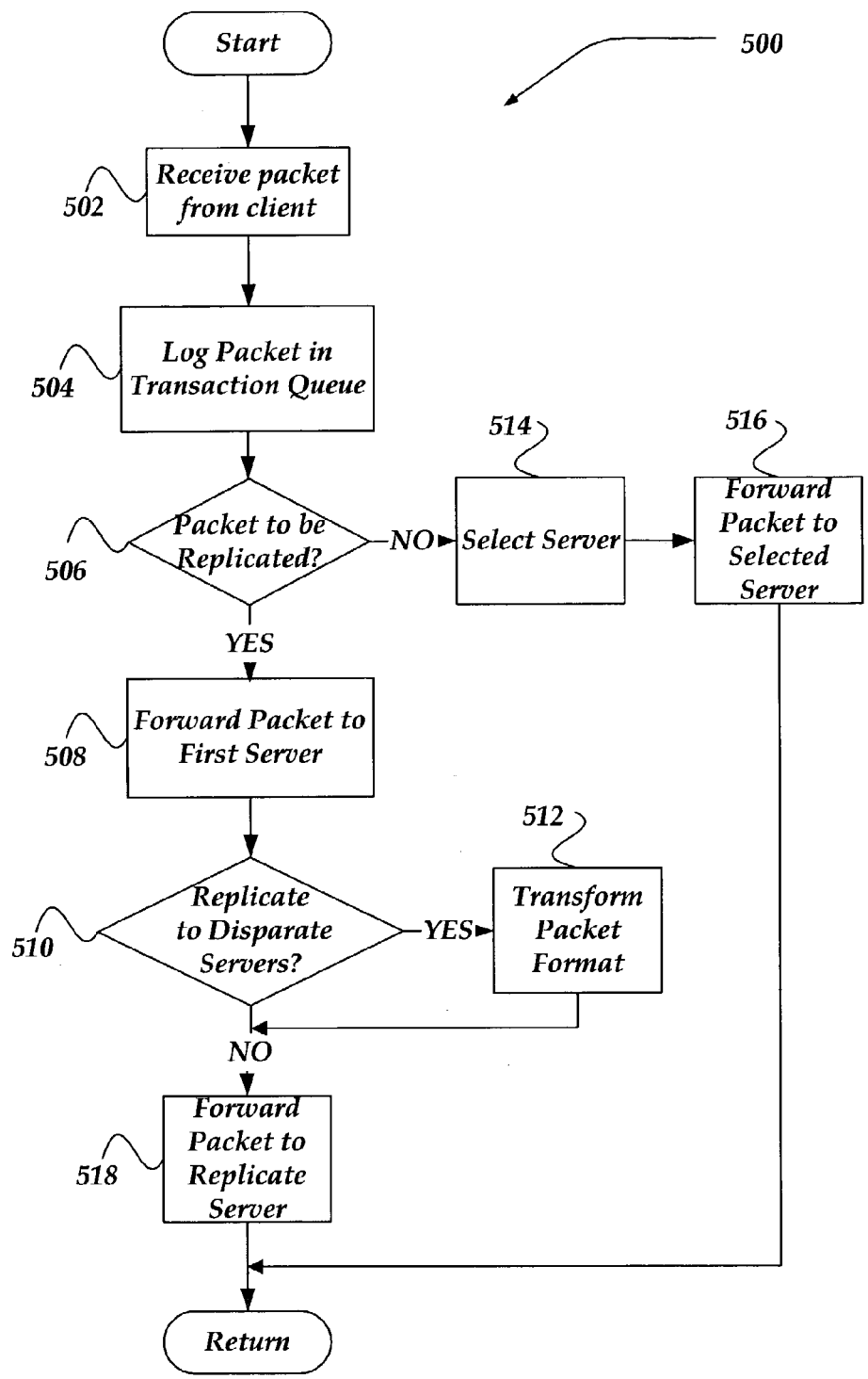
FIG. 5 illustrates a flow chart for one embodiment of a process for replicating a packet transaction over a network to at least two servers.

The operation of certain aspects of the present invention will now be described with respect to FIGS. 5-6. FIG. 5 illustrates a flow chart for one embodiment of a process for replicating a packet transaction over a network between at least two servers. Process 500 may operate, for example, within replicator 106 in FIG. 1. Process 500 may also be distributed across replicator 304 and distributor 302 in FIG. 3. Moreover, process 500 may also operate within integrated system 402 in FIG. 4.

Process 500 begins, after a start block, at block 502, when a packet is received from a client. The received packet typically represents a transaction with a server, such as servers 120-122 of FIG. 1. The transaction may represent a write transaction, a read transaction, and the like.

Processing continues to block 504 where the packet is logged in a transaction queue. Logging packets enable the invention to deal with the packet at some other time, replay the packet, group packets that may be related, and the like. Packets may be grouped based on connection types, with connection types grouped based in part on a session type, and the like. For example, a connection type may include a group of TCP packets beginning with a packet where a synchronization (SYNC) flag is set, and ending with a packet where a final (FIN), acknowledge (ACK) packet, and the like, is set. A session may be based in part on a group of TCP, UDP, and any other connection types. For example, a series of UDP packets may be grouped that are employed to send a single multimedia file. Packets may also be grouped where two or more TCP connections work in tandem, such as a CORBA control connection and a callback session, and the like.

Processing continues to decision block 506 where the received packet is examined to determine whether it is to be replicated. A packet may be selected for replication based on a variety of criteria, including, but not limited to, an IP header, TCP header, payload, IP option, IP flag, TCP port number, UDP port number, any other data associated with the packet. In one embodiment, a packet is selected for replication based on whether the packet payload is a write transaction. If the packet is to be replicated, processing continues to block 508; otherwise, processing branches to block 514.

At block 514, a server is selected for which the packet is to be forwarded. Any of a variety of mechanisms may be employed to select the server. Such selection mechanisms include, but are not limited to, round trip time (RTT), least connections, packet completion rate, quality of service, topology, global availability, hop metric, hash of an address in the packet, static ratio, dynamic ratio, address in the packet, content of the packet, and round robin. In one embodiment, a hash of the destination IP address and source IP address associated with the packet is employed to select the server. In another embodiment, a hash of an IP address and a port number associated with the packet is employed to select the server. In yet another embodiment, the selected server is a pre-determined server, such as the master server, and the like.

Moreover, at block 514, server selection is based in part on availability of a server. That is, at block 514, a service check may be performed against the array of servers to ascertain their operating state. The service check may also allow for a multi-step verification approach, and the like, to determine whether a full transaction may be completed for a given server. In the event that no server in the array of servers is available for selection, the packet may be queued for forwarding at some later time when a server does become available.

Processing continues to block 516, where the packet may be modified prior to forwarding it to the selected server. For example, the IP source address, IP destination address, source port, destination port, and the like, associated with the packet, may be modified. Moreover, a payload of the packet may be modified where an IP address, port, and the like, is embedded within the payload. Then, given that a server is available, the packet is forwarded to the selected server. Upon completion of block 516, processing returns to performing other actions.

At block 508, the packet may be modified substantially as described above, at block 516. The packet is then forwarded to a first server. The first server may be selected based on a variety of mechanisms, including, but not limited to, server availability, whether a server is pre-determined as the first server, round trip time (RTT), least connections, packet completion rate, quality of service, topology, global availability, hop metric, hash of an address in the packet, static ratio, dynamic ratio, address in the packet, content of the packet, and round robin.

Processing continues to decision block 510, where a determination is made whether the packet is to be replicated across a disparate server. If it is determined that the packet is to be replicated across the disparate server, processing branches to block 512; otherwise, processing continues to block 518.

At block 512, the packet is transformed to be compatible with the disparate server. For example, the payload of the packet may be transformed into a different format specific to the disparate server. The transformation may also include generating additional packets for handshaking, re-requesting packets, error handling, and the like. Additionally, as described above at block 516, the IP source address, IP destination address, source port, destination port, or the like, associated with the packet, may be modified for the disparate server. Processing proceeds to block 518.

At block 518, a connection is opened to the replicate server. The packet is forwarded to the replicate server such that at least a portion of the content on the first server and the replicate server is synchronized. If the replicate server is not available in the array, the packet may be forwarded at some later period, when the replicate server becomes available. In one embodiment, blocks 510, 512, and 518 may be repeated as appropriate for each replicate server in the array of servers. Upon completion of block 518, processing returns to perform other actions.

Figure 6:
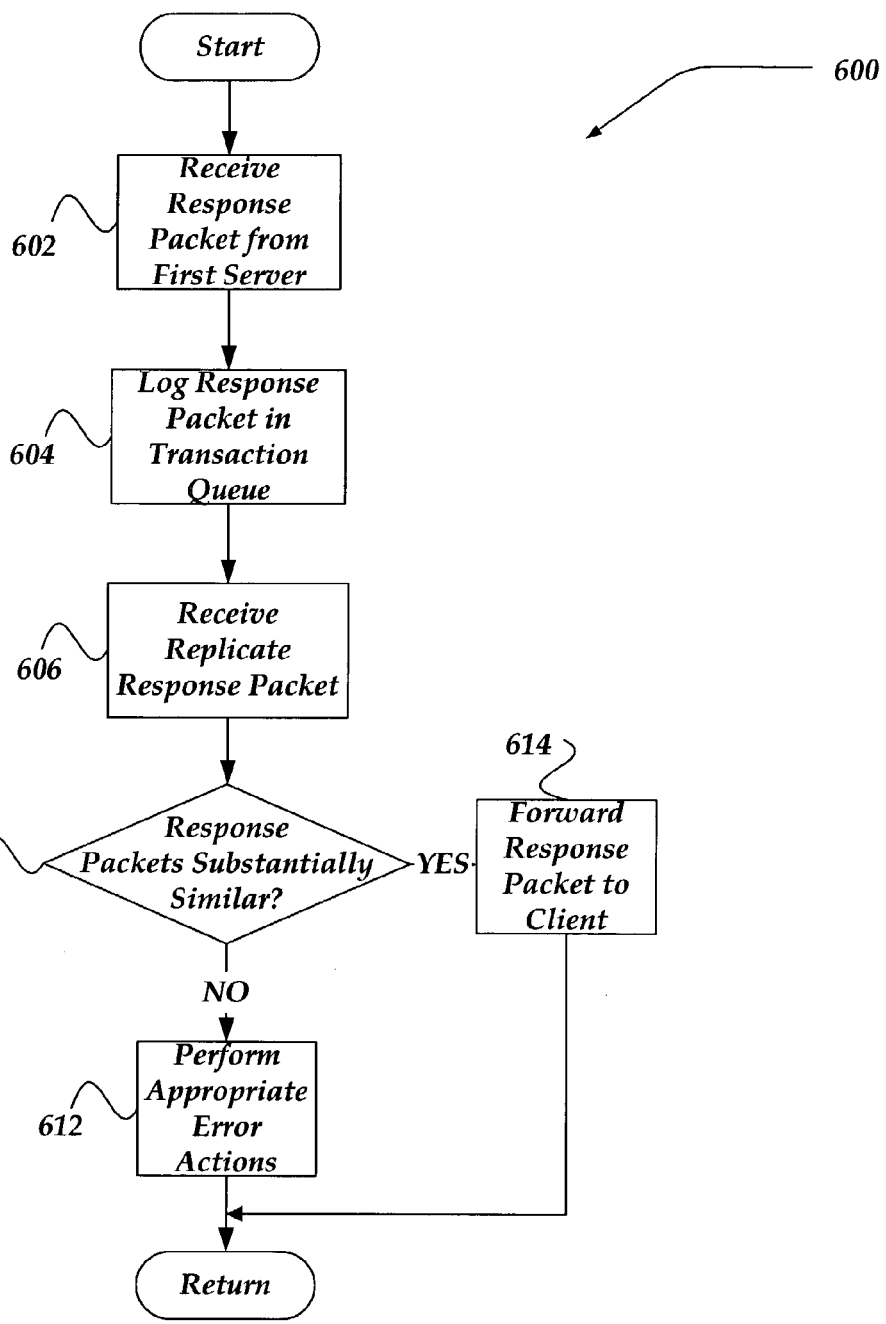
FIG. 6 illustrates a flow chart for one embodiment of a process for managing error checking over a network between at least two servers, in accordance with the present invention.

FIG. 6 illustrates a flow chart for one embodiment of a process for managing error checking over a network between at least two servers. Process 600 may operate for example, within replicator 106 of FIG. 1. Process 600 may also be distributed across replicator 304 and distributor 302 of FIG. 3. Moreover, process 600 may also operate within integrated distributor/replicator 402 of FIG. 4.

Process 600 begins, after a start block, at block 602, where a response packet is received from the first server selected at block 508 of FIG. 5. Processing continues to block 604, where the response packet is logged in the transaction queue. Processing continues to block 606, where if the packet is replicated, a replicate response packet is received from at least one replicate server. If at least one replicate server is a disparate server, the replicate response may be transformed into a format, protocol, and the like, such that it may be compared to the first response packet. In one embodiment, the replicate response packet is also logged in the transaction queue.

Processing proceeds to decision block 608, where a determination is made as to whether the first response packet and the replicate response packet are substantially similar. Responses may be substantially similar where the servers provide a response that has a substantially equivalent meaning, interpretation, action, and the like, including a substantially equivalent error message, accept message, request message, content, and the like. Substantially similar responses further include an instance where a database protocol, application, and the like, is different but has an intended substantially equivalent meaning, action, and the like. If it is determined that the response packets are substantially similar, processing branches to block 614; otherwise, processing branches to block 612.

At block 612, an appropriate error action is performed. For example, one error action may include resending the original packet to at least one replicate server, until response packets are substantially similar, or for a pre-determined number of times. Yet another error action may include sending an error message to the client computer. Still another error action may include providing a request to back out of the packet transaction to the first server. Upon completion of block 612, processing returns to perform other actions.

At block 614, the first response packet, the replicate response packet, a combination of the response packets, and the like, is forwarded to the client computer. Upon completion of actions at block 614, the process returns to performing other actions.

Although not specifically described in the above, blocks 606-614 may be repeated for each replicate server in the array of servers such that at least a portion of their content is synchronized with the first server.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for synchronizing a plurality of servers over a network, comprising:
   (a) receiving a packet from a client;
   (b) forwarding the packet to a first server in the plurality of servers, wherein the first server includes a first database;
   (c) forwarding the packet to at least one other server in the plurality of servers, wherein the at least one other server includes a second database that is disparate to the first database, comprising:
      determining that the at least one other server has a disparate configuration to a configuration of the first server; and
      transforming the packet into a format compatible with the disparate configuration;
   (d) receiving a response to the packet, from the first server;
   (e) receiving at least one other response to the transformed packet, from the at least one other server;
   (f) determining whether the response is different in content meaning from the at least one other response, and if it is, then resending the transformed packet to at least one other server in the plurality of servers until each of the response and the at least one other response are determined to be the same in content meaning or until a pre-determined number of resends have been performed, upon which an error message is sent to the client; and
   (g) sending one of the response or the at least one other response to the client based on a comparison of each of the response and the at least one other response that determines that the response and the at least one other response have a same content meaning independent of being identical, wherein forwarding the transformed packet synchronizes at least a portion of the content on the first server and the at least one other server.

2. A method for synchronizing a plurality of servers over a network, comprising:
   (a) receiving a packet from a client;
   (b) determining that the packet is a write packet and forwarding the packet and a replicate packet to at least two separate servers in the plurality of servers, comprising:
      determining that the at least two separate servers have disparate configurations; and
      transforming the packet and the replicate packet into a format compatible with the disparate configuration for each of the at least two separate servers;
   (d) receiving at least two separate responses from the at least two separate servers, and determining whether the at least two separate responses are different in content meaning from each other, and if it is, then resending the transformed replicate packet to at least one other server in the plurality of servers until each of the separate responses are determined to be the same in content meaning or until a pre-determined number of resends have been performed, upon which an error message is sent to the client; and
   (e) sending a response to the client based on a comparison of the at least two separate responses from at least two separate servers in the plurality of servers that determines that the at least two separate responses are the same in content meaning independent of the at least two separate responses being identical, wherein forwarding the transformed replicate packet synchronizes at least a portion of the content on the at least two separate servers.

3. The method of claim 2, wherein sending the response further comprises selecting to send the response that is in a content format consistent with the packet content format received from the client.

4. A system for replicating packet transactions over a network, comprising:
   (a) a plurality of servers including a computer processor, wherein at least two of the plurality of servers are configured to store the same content; and
   (b) a replication component that is programmed to perform actions, including:
      (i) receiving a packet from a client;
      (ii) forwarding the packet to a first server in the plurality of servers over the network;
      (iii) receiving a response to the packet, from the first server; and
      (iv) determining that the packet is to be replicated and at least one other server in the plurality of servers is available to receive packets;
      (v) forwarding a replicate packet to the at least one available other server, comprising:
         determining that the at least one available other server has a disparate configuration to a configuration of the first server; and
         transforming the replicate packet into a format compatible with the disparate configuration;
      (vi) receiving at least one other response to the transformed replicate packet from the at least one available other server;
      (vii) determining if each of the response and the at least one other response have a same content meaning independent of the response and the at least one other response being identical, and:
         if the response and the at least one other response have the same content meaning, then sending one of the response or the at least one other response to the client, wherein at least a portion of the content on the first server and the at least one available other server are synchronized as a result of forwarding the transformed replicate packet; and if the response is different in content meaning from the at least one other response, then resending the transformed replicate packet to at least one available other server in the plurality of servers until each of the response and the at least one other response are determined to be the same in content meaning or until a pre-determined number of resends have been performed, upon which an error message is sent to the client.

5. The system of claim 4, further comprising a distribution component that is programmed to perform an action, if the received packet is a read packet, of forwarding the received read packet to the first server in the plurality of servers.

6. The system of claim 4, wherein the packet that is replicated, further comprises a write packet.

7. The system of claim 4, wherein the replication component is programmed to perform actions, further comprising, storing the packet and the response to the packet.

8. The system of claim 4, wherein forwarding the transformed replicate packet further comprises delaying for a pre-determined period the forwarding of the transformed replicate packet.

9. The system of claim 4, wherein transforming the replicate packet further comprises transforming a packet payload of the replicate packet into a format compatible with the disparate configuration.

10. The system of claim 4, wherein configuration includes at least one of FTP server, database server, content server, and web server.

11. The system of claim 4, wherein the replication component is programmed to perform actions, further comprising, if the packet is a read packet, selecting the first server based on a load-balancing mechanism.

12. The system of claim 11, wherein the load-balancing mechanism is selected from at least one of a round trip time (RTT), a least connections, a packet completion rate, a quality of service, a topology, a global availability, a hop metric, a hash of an address in a received packet, a static ratio, a dynamic ratio, a source IP address, a destination IP address, a port number, and a round robin mechanism.

13. The system of claim 4, wherein determining that the packet is to be replicated is based in part on at least one of an IP Option, IP Flag, IP address, TCP port number, UDP port number, and a payload of the packet.

14. The system of claim 4, wherein the packet comprises at least one of an FTP packet, an NNTP packet, a CORBA session packet, and a database transaction packet.

15. An apparatus for replicating packet transactions over a network, comprising:
  (a) a transceiver component that is programmed to communicate packet transactions over the network;
  (b) a computer processor that executes a distribution component that is programmed to perform actions, including:
    (i) receiving a packet from a client;
    (ii) forwarding the packet to a first server in a plurality of servers, wherein at least two of the plurality of servers are configured to store the same content; and
    (iii) receiving a response to the packet, from the first server; and
  (c) a replication component that is programmed to perform actions, including:
    (i) determining that the received packet is a write packet and generating a replicate packet from the received packet;
    (ii) forwarding the replicate packet to at least one other server in the plurality of servers, comprising:
      determining that the at least one other server has a disparate configuration to a configuration of the first server; and
      transforming the replicate packet into a format compatible with the disparate configuration;
    (iii) receiving at least one other response to the transformed replicate packet from the at least one other server; and
    (iv) determining if each of the response and the at least one other response have a same content meaning independent of the response and the at least one other response being identical, and:
      if the response and the at least one other response have the same content meaning, sending one of the response or the at least one other response to the client, wherein at least a portion of the content on the first server and the at least the other server are synchronized as a result of forwarding the transformed replicate packet; and
      if the response is different in content meaning from the at least one other response, then resending the transformed replicate packet to at least one other server in the plurality of servers until each of the response and the at least one other response are determined to be the same in content meaning or until a pre-determined number of resends have been performed, upon which an error message is sent to the client.

16. An apparatus for synchronizing content on a plurality of servers over a network, comprising:
  (a) a transceiver programmed to receive and to forward packet traffic; and
  (b) a computer processor, coupled to the transceiver, that is programmed to perform actions, including:
    (i) receiving a packet from a client;
    (ii) forwarding the packet to a first server in the plurality of servers;
    (iii) forwarding a replicate packet based on the packet to at least one other server in the plurality of servers, comprising:
      determining that the at least one other server has a disparate configuration to a configuration of the first server; and
      transforming the replicate packet into a format compatible with the disparate configuration;
    (iv) receiving a response to the packet, from the first server;
    (v) receiving at least one other response to the transformed replicate packet, from the at least one other server; and
    (vi) determining if each of the response and the at least one other response have a same content meaning independent of being identical, and
      if the response and the at least one other response have the same content meaning, sending one of the response or the at least one other response to the client, wherein forwarding the transformed replicate packet synchronizes at least a portion of the content on the first server and the at least one other server; and
      if the response is different in content meaning from the at least one other response, then resending the transformed replicate packet to at least one other server in the plurality of servers until each of the response and the at least one other response are determined to be the same in content meaning or until a pre-determined number of resends have been performed, upon which an error message is sent to the client.

17. The apparatus of claim 16, wherein forwarding the transformed replicate packet further comprises delaying for a predetermined period the forwarding of the transformed replicate packet.

18. The apparatus of claim 16, wherein the disparate configuration includes at least one of FTP server, database server, content server, and web server.

19. An apparatus for replicating content on a plurality of servers over a network, comprising:
   memory; and
   one or more computer processors that include computer-executable instructions stored in the memory for:
   (a) a distributor that is in communication with the plurality of servers, the distributor being programmed to perform actions, including:
      (i) receiving a packet from a client;
      (ii) selecting a first server in the plurality of servers; and
      (iii) forwarding the packet to the first server; and
   (b) a replicator, performing further actions, including:
      (i) generating a replicate packet based on the received packet;
      (ii) forwarding the replicate packet to at least one other server in the plurality of servers, comprising:
         determining that the at least one other server has a disparate configuration to a configuration of the first server; and
         transforming the replicate packet into a format compatible with the disparate configuration;
      (iii) receiving a response to the packet, from the first server;
      (iv) receiving at least one other response to the transformed replicate packet, from the at least one other server; and
      (v) determining if each of the response and the at least one other response have a content meaning independent of being identical, and
         if the response and the at least one other response have a same content meaning independent of being identical, sending one of the response or the at least one other response to the client, wherein at least a portion of the content on the first server and the at least the other server are synchronized as a result of forwarding the transformed replicate packet; and
         if the response is different in content meaning from the at least one other response, then resending the transformed replicate packet to at least one other server in the plurality of servers until each of the response and the at least one other response are determined to be the same in content meaning or until a pre-determined number of resends have been performed, upon which an error message is sent to the client.

20. The apparatus of claim 19, wherein selecting the first server further comprises selecting the first server based on a load-balancing mechanism selected from at least one of a round trip time (RTT), a least connections, a packet completion rate, a quality of service, a topology, a global availability, a hop metric, a hash of an address in the received packet, a static ratio, a dynamic ratio, a source IP address, a destination IP address, a port number, and a round robin mechanism.

21. The apparatus of claim 19, wherein forwarding at least one of the packet and the transformed replicate packet further comprises performing a network address translation.

22. The apparatus of claim 19, wherein the disparate configuration includes at least one of a database server, content server, web server, and FTP server.

* * * * *